Figure 1:
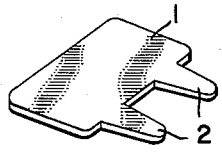

Jan. 26, 1960  P. REGGIANI  2,922,170
MEANS FOR FASTENING ELASTIC TAPES TO RIGID FRAMES
Filed Oct. 10, 1955  2 Sheets-Sheet 1

INVENTOR.
PIO REGGIANI
BY
Stone & Mack.
ATTORNEYS.

Jan. 26, 1960 P. REGGIANI 2,922,170
MEANS FOR FASTENING ELASTIC TAPES TO RIGID FRAMES
Filed Oct. 10, 1955 2 Sheets-Sheet 2

INVENTOR.
PIO REGGIANI
BY
Stone + Mack
ATTORNEYS.

333
2,922,170

MEANS FOR FASTENING ELASTIC TAPES TO RIGID FRAMES

Pio Reggiani, Milan, Italy

Application October 10, 1955, Serial No. 539,545

Claims priority, application Italy October 15, 1954

13 Claims. (Cl. 5—194)

This invention pertains to means for fastening elastic tapes to rigid frames across which the tapes are stretched in fastened condition; and has particular application to structures (rigid frame-tape units) used in the construction of furniture, e.g. chairs, settees, beds and the like; the tapes of the structure providing a resilient foundation or support for a cushion (fixed or loose), mattress, padding or other upholstery element or material; the term "upholstery" as here used includes, as will be understood, a loose cushion or mattress simply resting on or against the tapes of the structure (frame-tape unit). It is to be clearly understood, however, that the invention is not limited to structures for use in the furniture art but is of broad scope in this respect; also as regards the component material of the rigid frame, the component material of the tapes, the width of the tapes, the number of tapes in the structure, which may be any number from one upwards, and the form cross-sectionally of the rigid frame as regards the parts thereof (hereinafter referred to as "frame members") to which the tapes are fastened by the means of the invention.

The object of the present invention is to provide improved means in which the inconveniences of the prior art are avoided.

According to the invention, there is provided means for detachably fastening a length of elastic tape to a rigid frame, the tape extending tautly across the frame from one side member thereof, to which one end of the tape is anchored, to a second side member of the frame, to which the other end of the tape is anchored; characterized in that the anchorage of at least one end of the tape to the corresponding frame member is through the intermediary of an anchorage means on the frame adapted to hold the end of the tape to the frame against the pull of the tape, with the tape lying in a plane which is tangential to or flush with the surface of the frame member to which the tape is fastened; the position of the anchorage means being such that a portion of the tape, adjacent the end portion which is actually engaged by the anchorage means, is partially wrapped around the frame member.

Usually the tape will be fastened in accordance with the foregoing improved means at both ends, the tape being of a predetermined length to possess the required degree of tautness in the fastened condition, and the directions of wrapping of the tape ends around the respective frame members being opposite to one another.

The invention may be carried into effect in a variety of ways, with reference to four general forms of the invention, designated, respectively, as forms A, B, C and D, all of which give satisfactory results. The embodiment, designated as form A, is the subject of this application; while the embodiments, designated as forms B, C and D, are the subjects of continuations of this application.

According to form A, the anchorage for the end of each tape of a frame-unit consists of a rigid flange carried on the frame member of the unit, in combination with a rigid element, detachably held in assembled position by said flange, and engaging the end portion of the tape.

One arrangement is that in which the flange forms with the surface of its frame member a recess, extending lengthwise of the frame member and transversely to the tape, and the rigid element consists of an anchorage plate, adapted (under the pull of the tape) to interlock with said flange and frame member, occupying (when so interlocked) a position in which a tail portion of the plate is disposed within said recess.

The flange may extend continuously along the frame member, (e.g. in a case where the means is applied to a structure in which there are a number of tapes fastened side by side to the same frame member), past two or more of the tapes to be fastened thereto; the arrangement being such that the anchorage of the tape of the frame member can be effected anywhere therealong within the length compass of the flange.

More especially, in cases where the tape is reinforced with a textile insertion, the anchorage plate may have one or more fingers which extend through pre-formed holes provided in the tape to receive them; said fingers projecting from the edge of the plate remote from the tail portion thereof. Alternatively, and more especially where the tape is devoid of a textile insertion, the anchorage plate may have a slot or slots near the side of the plate remote from the tail portion thereof, through which slot or slots the tape end is threaded; the threaded-through end portion of the tape intervening between the surface of the frame member and the part of the tape wrapped therearound.

The anchorage plate may be riveted to the extremity of the tape, or alternatively stitched thereto, e.g. by metal wire stitching.

According to another arrangement, the rigid element, intervening between the end portion of the tape and the flange in engagement with both, may consist of an anchorage plate permanently secured, e.g. by riveting, to the extremity of the tape; said plate carrying one or more hooks which project from said extremity and hook over the free edge of the flange.

According to yet another arrangement, the rigid element, intervening between the end portion of the tape and the flange in engagement with both, may consist of a number of metal wire hooks permanently secured to the extremity of the tape; said hooks projecting from said extremity and hooking over the free edge of the flange.

Figure 13:
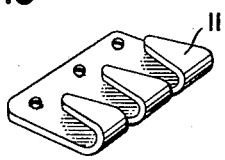
Figure 14:
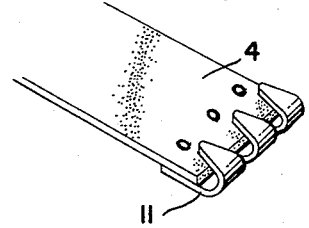
Figure 15:
Figure 16:
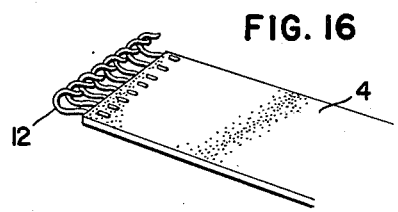

The invention will now be further described with reference to the accompanying drawings, in which:

Figures 1 to 4 illustrate a first species of the invention; Figures 5 to 8 a second species;

Figures 9 to 12 a third species, Figures 13 and 14 a fourth species; and Figures 15 and 16 a fifth species.

Figure 2:
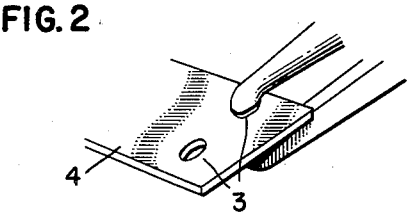

Figure 1 shows one of the anchorage plates of the fastener. The plate comprises a rectangular body portion 1 and a plurality of fingers 2. The plate is conveniently composed of sheet steel. There are two of such plates in the fastening (considering any individual tape of the rigid frame-tape unit), one at each end of the tape; and in the fastened condition of the tape the fingers 2 are inserted through pre-formed holes 3 (Figure 2) punched out for their reception in the tape 4 (Figure 2).

Figure 3:
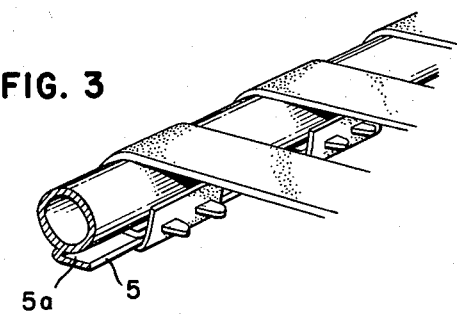
Figure 4:
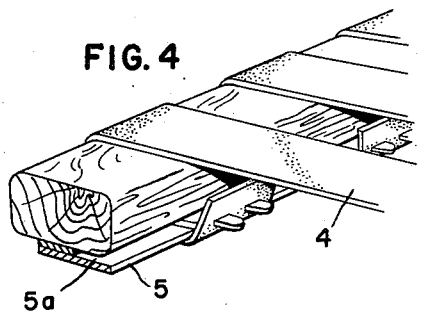
Figure 5:
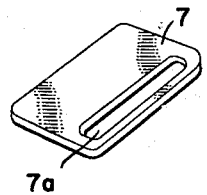

Figures 3 and 4 clearly illustrate the manner in which the anchorage plates 1 are used; Figure 3 showing a construction in which the frame member is of metal tubing, and Figure 4 a construction in which the frame member is composed of wood. In both cases there is a rigid flange 5, integral with or fixed to the underside of the frame member, and forming with the surface of said underside a recess 5a, lengthwise of the frame member;

and in which recess is received the tail portion of the anchorage plate 1, so that (under the pull of the tape upon the fingers 2) said tail portion is interlocked with the flange on the one hand and the frame member on the other. The flange is integral with the frame member in Figure 3 and non-integral in Figure 4, being in the latter case suitably affixed to the frame member.

First one end of the tape is fastened to the corresponding frame member and then the other end of the tape is similarly fastened; the anchorage plates 1 having first been applied to the respective end portions of the tape by inserting the fingers 2 through the holes 3 in the tape. With the plate 1 in position at the end of the tape first fastened (which end will hereinafter be referred to as the "initial" end, the opposite end of the tape being referred to as the "terminal" end), the said plate 1 is first inserted into the recess 5a of the corresponding frame member; whereafter the end portion of the tape carrying the plate is wrapped about the outer side of the frame member. The tape is then stretched across the frame to the opposite frame member, and its "terminal" end portion, with the corresponding anchorage plate 1 in position upon it, is wrapped round said opposite frame member, and finally the terminal anchorage plate is entered into the corresponding recess. This completes the fastening operation and by reversing the steps comprising the operation either end of the tape may be easily disengaged from the corresponding frame member. Thus, for detachment of the tape from the frame, or for adjustment of its tension thereon after a certain period of use of the frame-tape unit, or during assembly of the unit in order to ensure that the tension is the same in all of the tapes, such adjustment of the tension is accomplished, as will be understood, merely by inserting the fingers 2 of the anchorage plate through a fresh set of holes 3 in the tape.

It will be appreciated that an arrangement as above described has the characteristic that the general plane of the tapes is coincident with the plane of the top of the rigid frame. This is important in many instances, e.g. in the case of a unit in which the tapes serve to provide a resilient support or foundation for upholstery elements or material, where as is known it is a disadvantage for the level of the top of the frame to be above that of the tapes.

Another advantage of an arrangement as above described is that the presence of the flange 5, in the case of a frame composed of metal tubing, results in a marked stiffening of the tubing, thereby enabling thinner tubing to be employed. Also, in the case of a structure (frame-tape unit) for divans and beds, the number of cross bars usually incorporated in the frame can be reduced in virtue of the stiffening effect, with consequent saving of material and reduction of weight of the frame. Said stiffening effect will also allow the employment, as the component metal of the tubing, of certain light alloys which on account of their high cost would not otherwise be used, i.e. in the thicknesses hitherto necessary.

It will be appreciated that the number of fingers 2 in the anchorage plate may be any number (i.e. one or more than one) according to requirements.

Figure 6:
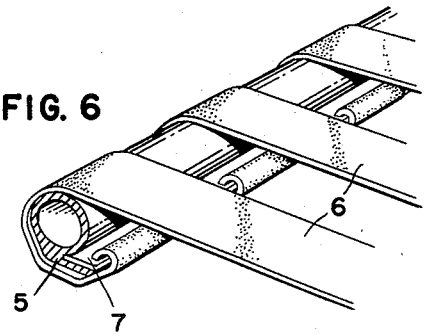
Figure 7:
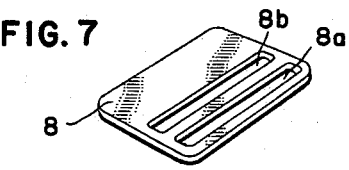
Figure 8:
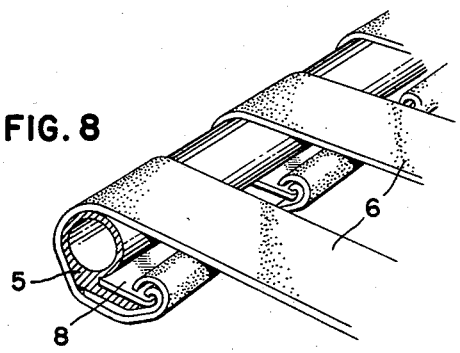
Figure 9:
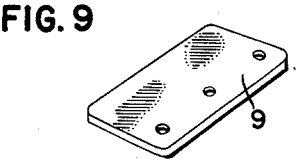
Figure 10:
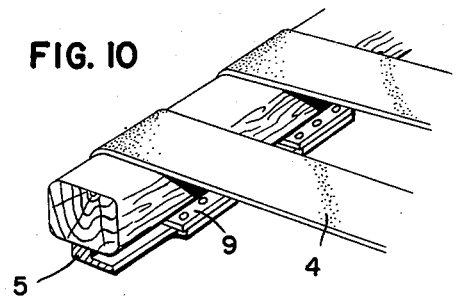
Figure 11:
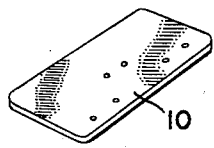
Figure 12:
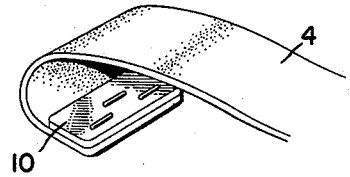

Anchorage plates as illustrated in Figure 1 are specially suitable in cases where the tape is reinforced with a textile insertion. In cases where the tape is devoid of such an insertion it is generally preferable to employ an anchorage plate having one or more slots through which the tape end is threaded in the manner hereinbefore described, so as to be firmly fastened to the frame member through the intermediary of the anchorage plate. Figures 5 to 8 illustrate this modification. In Figure 6, the end of the tape 6 is threaded through the slot 7a in the anchorage plate 7, with its extreme end portion sandwiched in between the part of the tape in rear of the threaded-through portion and the underside of the flange 5, and so as to ensure a firm hold. In Figure 8, the end portion of the tape 6 is first threaded through slot 8b (Figure 7) and then through 8a, with its threaded-through end sandwiched in between the part of the tape in rear of the threaded-through portion and the edge portion of plate 8 adjacent slot 8a, so as to insure a doubly firm hold. It will be understood that the means of anchoring the tape end illustrated in Figures 5 to 8 is specially advantageous in cases where the tape is a plain (non-reinforced), since it does not involve any aperturing of the tape end. It may equally well be used, however, with a reinforced tape.

According to the modification illustrated in Figures 9 and 10 and Figures 11 and 12, an anchorage plate 9 or 10 may be employed which is permanently secured, as by riveting (Figures 9 and 10) or metal wire stitching (Figures 11 and 12), to the tape end 4. In this modification, the anchorage plate is devoid of either fingers or slots.

According to the modification illustrated in Figures 13 and 14, the permanently secured anchorage plate may carry one or more curved hooks 11, adapted to hook over the free edge of the flange 5.

According to the modification illustrated in Figures 15 and 16, the tape 4 is anchored to the flange 5 by means of a number of rigid metal wire hooks 12 permanently affixed to the tape end in the manner clearly shown in Figure 16.

While I have described and illustrated five preferred embodiments of the general form of my invention herein disclosed, I desire it to be understood that I do not limit my invention to the precise details of construction and arrangement shown by way of illustration, as these may be changed and modified by those skilled in the art without departing from the spirit of my invention or exceeding the scope of the appended claims.

I claim:

1. Means for detachably fastening elastic, load-supporting tapes to a rigid, load-supporting frame member, comprising: a length of taut, elastic, load-supporting tape of rectangular cross-section, having a flat upper surface which directly supports a superimposed contacting load; anchorage means comprising an exterior flange on and coextensive with said frame member of substantial length, and defining therewith a continuous open-mouth, recessed slot; and a rigid connecting element having only one end portion inserted in said slot and its other end portion attached to an end portion of said tape which is wrapped partially around said frame member, and said element detachably engages said anchorage means solely by impingement thereon of its said end portion, so that said tape is anchored directly to said frame member at its place of attachment thereto by virtue of the tension in said tape; said tape lying in a plane substantially flush with the load-supporting surface of said frame member.

2. Fastening means according to claim 1, wherein said flange is located on the side of its supporting frame member directly opposite the side to which said tape is tangential.

3. Fastening means according to claim 1, wherein said connecting element consists of a flat plate, of which only a tail portion is disposed within said slot and interlocks with said flange and frame member solely by direct impingement thereon, when pull is exerted by said tape; no portion of said tape being disposed within said slot.

4. Fastening means according to claim 1, wherein said flange engages a plurality of spaced connecting elements, each detachably attached to one of a plurality of parallel tapes, each of which directly supports a superimposed load.

5. Fastening means according to claim 3, wherein said plate is detachably attached to said tape by means of at least one finger, which projects from the edge of said plate opposite its tail portion, and extends through a preformed hole in said tape.

6. Fastening means according to claim 3, wherein the plate is detachably attached to said tape by means of at least one slot, near the edge of said plate opposite its tail portion, through which an end portion of said tape is threaded and then inserted between said supporting member and an overlying portion of said tape which is wrapped partially around said member.

7. Fastening means according to claim 3, wherein said plate is permanently connected to said tape by rivets.

8. Fastening means according to claim 3, wherein said plate is connected to said tape by wire stitching.

9. Fastening means according to claim 1, wherein said connecting element comprises an anchorage plate riveted to said tape and having at least one hook, which engages said flange.

10. Fastening means according to claim 1, wherein said connecting element comprises a plurality of metal wire hooks permanently secured to said tape; said hooks extending beyond the end of said tape and engaging said flange.

11. Fastening means according to claim 1, wherein the frame member is composed of wood.

12. Fastening means according to claim 1, wherein the frame member is composed of metal tubing.

13. Means for detachably fastening a length of taut elastic, load-supporting tape to a rigid frame member, comprising in combination: a rigid, exterior flange on and coextensive with said frame member of substantial length on one side thereof directly opposite its load-supporting surface, and forming a continuous, open-mouth, recessed slot therewith; and a rigid connecting element having one end detachably attached to said tape and its other end inserted into said slot, so that said element interlocks with said flange and member without deformation and solely by direct contact and impingement thereon and only when pull is exerted by said tape, whereby said tape is anchored to said member by virtue of its tension; said tape being partially around said member and lying wholly outside said recess in a plane substantially flush with the load-contacting and supporting surface of said member.

References Cited in the file of this patent

UNITED STATES PATENTS

| | | |
|---|---|---|
| 678,092 | Baynes | July 9, 1901 |
| 941,659 | Shea | Nov. 30, 1909 |
| 1,020,407 | Foster | Mar. 19, 1912 |
| 1,115,587 | Schwartzman | Nov. 3, 1914 |
| 2,354,728 | Asaro | Aug. 1, 1944 |
| 2,444,873 | Goldberg | July 6, 1948 |
| 2,612,213 | Bott | Sept. 30, 1952 |
| 2,622,663 | Burd | Dec. 23, 1952 |
| 2,629,432 | Hanslick | Feb. 24, 1953 |
| 2,649,636 | Freysinger | Aug. 25, 1953 |

FOREIGN PATENTS

| | | |
|---|---|---|
| 25,267 | Great Britain | Dec. 31, 1903 |
| 381,972 | Great Britain | Oct. 17, 1932 |
| 1,026,578 | France | Feb. 4, 1953 |